United States Patent [19]

Renzi et al.

[11] Patent Number: 4,970,293

[45] Date of Patent: Nov. 13, 1990

[54] LIQUID GLASS FORMING COMPOSITION FROM DIALLYL CARBONATE AND DIOL MIXTURE

[75] Inventors: Fiorenzo Renzi, Gorgonzola; Franco Rivetti, Schio; Ugo Romano, Vimercate, all of Italy

[73] Assignee: Enichem Synthesis, SpA, Palermo, Italy

[21] Appl. No.: 209,862

[22] Filed: Jun. 22, 1988

[30] Foreign Application Priority Data

Jul. 31, 1987 [IT] Italy .............................. 21562 A/87

[51] Int. Cl.$^5$ ............................................. C08G 64/00
[52] U.S. Cl. .................................... 528/370; 528/371
[58] Field of Search ................................. 528/370, 371

[56] References Cited

U.S. PATENT DOCUMENTS 4,464,525 8/1984 Vance ................................. 528/370
4,518,766 5/1985 Greco et al. ........................ 528/370

Primary Examiner—Harold D. Anderson
Attorney, Agent, or Firm—Hedman, Gibson, Costigan & Hoare

[57] ABSTRACT

A liquid composition polymerizable by the free-radical polymerization route, with a low shrinkage, to yield organic glasses endowed with high thermal stability, is constituted by the product of transesterification of diallyl-carbonate (A) with a mixture of diol (B) and of a polyol (C) containing from 3 to 6 hydroxy groups in the molecule, or a mixture of a diol (B) with a cycloaliphatic diol (C'), by operating with a molar ratio of A/(B+C) or A/(B+C') equal to, or larger than, 3/1, and with an amount of (C) in the (B+C) mixture equal to, or smaller than, 70% by weight, or with an amount of (C') in the (B+C') mixture equal to, or smaller than, 90% by weight.

18 Claims, No Drawings

LIQUID GLASS FORMING COMPOSITION FROM DIALLYL CARBONATE AND DIOL MIXTURE

The present invention relates to a liquid composition, polymerizable by the free-radical polymerization route, to yield organic glasses endowed with a high thermal stability.

The invention relates also to the organic glasses which can be obtained from said composition.

In the sector of the high-transparence organic glasses, those obtained by means of the polymerization of bis(allyl-carbonate) of diethylene glycol are of considerable interest from a commercial viewpoint, owing to their particular mechanical characteristics, and characteristics of chemical and ageing resistance.

See, e.g., F. Strain, "Encyclopaedia of Chemical Processing and Design", 1$^{st}$ ed., Dekker Inc., New York, Volume II, pages 452-foll.; and "Encyclopaedia of Polymer Science and Technology", Vol. I, pages 799-foll., Interscience Publishers, New York, 1964.

However, the products of polymerization of bis(allyl-carbonate) of diethylene glycol suffer from a limitation deriving from the relatively low values of their heat distortion temperature (HDT), of the order of 65° C., what makes them unsuitable in applications wherein high operating temperatures are required.

In order to overcome such a drawback, the use was proposed of copolymers of diethylene glycol bis(allyl-carbonate) containing up to approximately 10% by weight of triallyl cyanurate, such as disclosed, e.g., by H.W. Starkweather et al. in Ind. Eng. Chem., Vol. 47, No. 2, 1955, page 302.

However, if on one hand they show improved heat distortion temperatures, on the other hand such copolymers show inferior values of some other characteristics than the polymerizate obtained from diethylene glycol bis(allyl-carbonate) alone.

In particular, the possibility of being polymerized by means of the usual casting method results endangered for such copolymers, owing to the presence of phenomena of cracking during polymerization, or at mould opening time. Said phenomena mainly derive from the high shrinkage during the polymerization step, and from the higher fragility of the polymerizates, deriving from their considerable crosslinking density.

The present Applicant has found now that the above reported drawbacks affecting the prior art can be overcome by means of the liquid composition of the present invention, which can be easily polymerized by free-radical polymerization, with little shrinkage during polymerization, in order to yield organic glasses endowed with high values of thermal distortion temperature.

In accordance therewith, the present invention relates to a liquid composition polymerizable by free-radical polymerization route and with little shrinkage, to yield organic glasses endowed with high thermal stability, said composition being the product from the reaction, under transesterification conditions, of diallyl-carbonate (A) with a mixture of an either linear or branched aliphatic diol containing from 3 to 10 carbon atoms in its molecule (B), and an either linear or branched aliphatic, cycloaliphatic or heterocyclic polyol containing from 4 to 20 carbon atoms and from 3 to 6 hydroxy atoms in its molecule (C), or with a mixture of said (B) diol with a cycloaliphatic diol (C'), by operating with a molar ratio of A/(B+C) or of A/(B+C') equal to, or higher than, 3/1, and with an amount of (C) in the (B+C) mixture equal to, or lower than, 70% by weight, or with an amount of (C') in the (B+C') mixture equal to, or lower than, 90% by weight.

According to the preferred form of practical embodiment, the values of the molar ratios of (A)/(B+C) and (A)/(B+C') are kept comprised within a range of from 3/1 to 12/1, and the (C) and (C') components are respectively present in an amount comprised within the range of from 20 to 60% and of from 20 to 80% by weight in the mixture (B+C) and (B+C').

The (B) diols useful for the purposes of the present invention are the either linear or branched aliphatic diols containing from 3 to 10 carbon atoms in their molecule.

Specific examples of diols are diethylene glycol, triethylene glycol, tetraethylene glycol, 1,4-butanediol, 1,6-hexane-diol, 1,3-propane-diol, neopentyl glycol, dipropylene glycol and 2,2,4-trimethyl-1,3pentanediol.

Among them, diethylene glycol is preferred.

The (C) polyols, useful for the purposes of the present invention, are either linear or branched aliphatic, cycloaliphatic or heterocyclic diols, containing from 4 to 20 carbon atoms, and from 3 to 6 hydroxy groups in their molecule.

Specific examples of polyols suitable for the intended purpose are: pentaerythritol, trimethylolpropane, di-pentaerythritol, di-trimethylol-propane and tris(hydroxyethyl)isocyanurate.

Among these, pentaerythritol, trimethylolpropane and tris(hydroxyethyl)isocyanurate are preferred.

The (C') component, useful for the intended purpose, is selected from cycloaliphatic, monocyclic or polycyclic diols, with 1,4-cyclohexane-di-methanol and 4,8-bis(hydroxy-methyl)tricyclo[5.2.1.0$^{2,6}$]decane.

The composition according to the present invention is obtained by starting from diallyl-carbonate (A) and from the (B+C) or (B+C') mixture by operating under transesterification conditions. More particularly, the process is carried out by placing the reactants into mutual contact, in the hereinabove stated proportions, and making them react at temperatures comprised within the range of from 80° to 160° C., and preferably of from 90° to 130° C. in the presence of a catalyst of alkaline character, with the allyl alcohol which is formed as the reaction byproduct being continuously removed. Suitable catalysts for the intended purpose are hydroxides, carbonates and alkoxides of alkali metal, the organic bases and the basic ion-exchange resins.

Specific examples of catalysts are sodium hydroxide, sodium carbonate, sodium methoxide. The catalyst is advantageously used in an amount equal to at least 1 ppm (part per million parts by weight), relatively to the sum of the weights of (B+C) or (B+C') components, and preferably in amounts comprised within the range of from 0.01 to 0.3% by weight.

The reaction is advantageously carried out under such a pressure that the system is made boil at the selected operating temperature, so as to favour the removal of allyl alcohol from the reaction mixture; e.g., pressure values comprised within the range of from 20 to 760 torr and preferably of from 50 to 400 torr are suitable for the intended purpose.

Under the above specified conditions, the reaction times are generally comprised within the range of from 0.5 to 20 hours, and typically are of the order of from 0.5 to 2 hours.

After cooling, the reaction mixture is washed with water, in order to remove the small catalyst amounts, and, after de-mixing and separation of the aqueous phase, the unreacted diallyl carbonate is distilled off, by heating up to temperatures of the order of 120° C., under a decreasing pressure, with end pressure values of the order of 0.1-20 Torr, and preferably of 1-3 Torr, with the desired product being obtained as the residue.

The composition is finally submitted, if necessary, to filtration, after a preliminary treatment with activated charcoal.

The composition according to the present invention is liquid at room temperature, and has viscosity values comprised within the range of from 15 to 300 cst and density values of the order of 1.1–1.3 g/ml.

The composition of the present invention is a complex mixture containing allyl-carbonates of the (B) component and of the (C) or (C') component, in either monomer or oligomer form, as well as mixed oligomer allyl-carbonates of said (B) and (C) or (C') components, with the relative amounts of said constituents of the composition mainly depending on the preselected ratios of the (A), (B) and (C) or (C') reactants.

This composition can be transformed into organic glasses, by means of free-radical polymerization, with the usual "casting" technique.

For that purpose, to the composition one or more polymerization initiator(s) is(are) added, which are soluble in the same composition, and is(are) capable of generating free radicals at temperatures comprised within the range of from 30° to 120° C.

Preferred examples of such initiators are di-cyclohexyl-peroxy-dicarbonate, di-isopropyl-peroxy-dicarbonate, di-benzoyl-peroxide, di-sec.-butyl-peroxy-dicarbonate and sec.-butyl-cyclohexyl-peroxy-dicarbonate.

The amount of initiator may generally vary within the range of from 1 to 6 parts by weight per each 100 parts by weight of the composition.

The composition can additionally contain one or more conventional additive(s), such as stabilizers, lubricants, dyes, pigments, U.V.-absorbers, I.R.-absorbers and the like, with the overall amount of such additives being anyway not higher than 1 part by weight per each 100 parts by weight of the same composition.

The composition of the present invention containing the initiator, and, possibly, one or more additive(s) selected from the above mentioned additives, is transformed into the relevant organic glass by operating at temperatures comprised within the range of from 30° to 120° C., with polymerization times which can be generally comprised within the range of from 1 to 100 hours.

During the polymerization, small-extent phenomena of shrinkage occur, and the organic glasses obtained have a high thermal distorsion temperature (HDT higher than approximately 90° C., when determined by ASTM D-648), and a good set of optical and physical/mechanical characteristics.

The so-obtained organic glasses are particularly useful in protecting shields (e.g., for welders), in sight windows (e.g., in blast furnaces), in windows in the transportation sector and in the civil building sector, in lenses for vehicle lights, in solar and photovoltaic collectors and panels, in substrates for optical disks and in panels for displays.

The following experimental Examples are reported for exemplifying purposes, and are not to be construed as being limitative of the present invention.

In the following examples, liquid polymerizable compositions are prepared by reacting, under transesterification conditions, diallyl-carbonate (A) and a mixture of the hydroxy-compounds.

The (B) diol used in the examples is diethylene glycol (DEG).

The (C) polyols used in the examples are: pentaerythritol (PE); tris-hydroxyethyl-isocyanurate (THEIC); and trimethylol-propane (TMP).

The (C') cycloaliphatic diol used in the examples is 1,4-cyclohexane-dimethanol.

To the so-obtained liquid compositions, dicyclohexyl-peroxy-dicarbonate (DCPD) is added as the initiator, in an amount of 5% by weight, of the mixture weight.

The catalyst-containing compositions are transformed by polymerization into flat sheets or neutral lenses, respectively of 3 mm and 2 mm of thickness, by means of the conventional casting technique. According to this technique, the liquid composition, containing the catalyst, is cast into the hollow of a mould constituted by two glass elements, with a spacer gasket of plasticized polyvinyl-chloride or of ethylene-vinyl acetate copolymer (EVA).

The liquid composition is then submitted to polymerization by means of a thermal treatment carried out for 72 hours inside a forced air circulation oven at 48° C.

At the end of this treatment, the moulds are opened and the polymerizates are recovered and are left standing at 110° C. for a further 2 hours, in order to decompose any possible residues of initiator, and of relieving possible inner stresses.

On the so-obtained sheets, the following characteristics are determined:

(a) Optical Characteristics:
  Refractive index ($n_D^{20}$): measures by Abbe refractometer (ASTM D-542);
  Haze and transmittance at visible wave lengths (%): measured by using Gardner's Hazegard XL-211 (ASTM D-1003);
  Yellow index (YI), defined as:

$$YI = \left(\frac{100}{Y}\right) \cdot (1.277X - 1.06Z)$$

as determined by means of Gardner's XL-805 colorimeter (ASTM D-1925).

(b) Physical and Mechanical Characteristics
  Density: as determined by means of the hydrostatic balance at the temperature of 25° C. (ASTM D-792);
  Shrinkage during polymerization, computed by means of the following formula:

$$\text{Shrinkage \%} = \frac{(\text{polymer density} - \text{monomer density})}{\text{polymer density}} \times 100$$

Rockwell hardness (M), as measured by the Rockwell durometer (ASTM D-785);
  Elastic modulus at bending (ASTM D-790);
  Abrasion resistance, Taber method (ASTM D-1044, modified), carried out with a couple of grinding wheels CS-10F and under a load of 500 g on both wheels.

The results are expressed as the ratio of the number of passages necessary for producing a 10% increase in Haze for the sample being tested, to the same parameter for a reference sample of poly-methylmethacrylate (PMMA).

On the neutral lenses, the

Sutherland Abrasion Resistance is determined.

The test consists in carrying out 25 abrasive cycles (50 passages), on the neutral lenses, of a pad of 2/0-type steel wool of 5.5 cm x 7.5 cm, loaded with a weight of 630 g. The abrasion degree produced is evaluated by means of the visual observation of the number, the length and the depth of the scratches, as compared to a corresponding reference sample based on diethylene glycol bis(allyl-carbonate) homopolymer. The abrasion resistance is expressed by means of a scoring on a scale of from 0 to 10, wherein score 10 is assigned to the scratch-free sample, or to a sample showing from one to three thin, not very deep scratches, and score 0 is assigned to the completely scratched sample (this is the case of diethylene glycol bis(allyl-carbonate) homopolymer, assumed as the reference standard). Intermediate scores from 1 to 9 are assigned on the basis of the percentage of scratches shown by the tested sample, as compared to the reference standard. For example, if the sample shows a 60% of scratches relatively to the reference standard, its abrasion resistance value is 4; if it shows a 30% of scratches, its assigned score is 7, and so on.

(c) Thermal Characteristics

Heat Distorsion Temperature Under Load 1.82 MPa (HDT), (ASTM D-648)

Example 1

To a three-neck flask with jacket, fitted with a thermometer, a magnetic stirrer and an overhead distillation column with 20 perforated trays, there are charged:

Trimethylol-propane (TMP): 60 g (0.447 mol)
Diethylene glycol (DEG): 140 g (1.320 mol)
Diallyl-carbonate (DAC): 1,254 g (8.835 mol)
Solution at 30% by weight of sodium methoxide in methanol: 0.20 ml The reaction is carried out for 45 minutes at a temperature of 98°–118° C., and under a pressure of 150 torr, with allyl alcohol being distilled off as it forms (total 230 g; purity of 99,0%).

After cooling, the reaction mixture is washed with two portions of 500 ml each, of distilled water.

The excess of diallyl-carbonate is distilled under 1 torr, with increasing temperature up to 120° C.

The obtained product is decolorized by contact with 2% by weight of activated charcoal, for 4 hours at 80° C., and is then filtered.

In this way, 500 g is obtained of a liquid product having the following characteristics:

Viscosity (25° C.): 34.5 cst
Density (20° C.): 1.164 g/ml
Refractive index ($n_D^{20}$): 1.4585
Colour (APHA): 15

This product is a mixture of both monomer and oligomer diethylene glycol bis(allyl-carbonate), trimethylolpropane tris(allyl-carbonate), and of mixed allyl-carbonates, having the following presumed composition:

Diethylene glycol bis(allyl-carbonate):

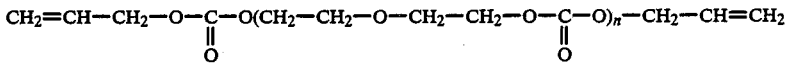

monomer n=1 45.8% by weight;
dimer n=2 10.1% by weight.

Trimethylol-propane tris(allyl-carbonate):
monomer 17.3% by weight;

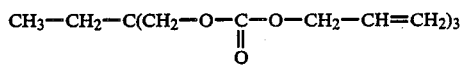

dimer 2.4% by weight.

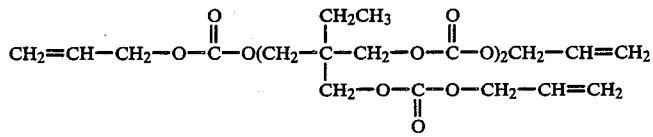

Mixed allyl-carbonate: 10.1% by weight

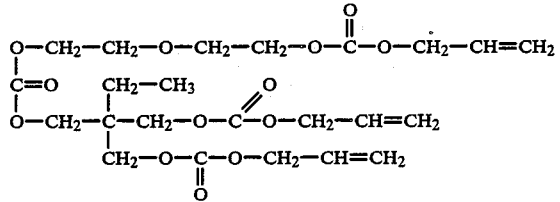

with the residual percentage being essentially constituted by the higher oligomers of the above disclosed species.

Example 2

To the same equipment as disclosed in Example 1, there are charged:

Tris(hydroxyethyl)isocyanurate (THEIC): 30.0 g (0.115 mol);
Diethylene glycol (DEG): 70.0 g (0.660 mol);
Diallyl-carbonate (DAC): 1,320 g (9.30 mol);
Solution at 30% by weight of sodium methoxide in methanol: 0.15 ml.

The reaction is carried out for 1.5 hours at a temperature of 116°–119° C., and under a pressure of 150 torr, with allyl alcohol being distilled off as it forms (total 98 g; purity of 96%).

After cooling, the reaction mixture is washed with two portions of 500 ml each, of distilled water.

The excess of diallyl-carbonate is then distilled under 1 torr, with increasing temperature up to 120° C.

The so obtained product is filtered over decalite.

In this way, 212 g is obtained of a liquid product having the following characteristics:

Viscosity (25° C.): 47.06 cst
Density (20° C.): 1.195 g/ml
Refractive index ($n_D^{20}$): 1.4640

Colour (APHA): 15

This product is a mixture of both monomer and oligomer diethylene glycol bis(allyl-carbonate), tris(hydroxyethyl)isocyanurate tris(allyl-carbonate), and of mixed allyl-carbonates, having the following presumed composition:

Diethylene glycol bis(allyl-carbonate):

```
  O—CH2—CH=CH2
  |
  C=O                              O
  |                                ‖
  O(CH2—CH2—O—CH2—CH2—O—C—O)n—CH2—CH=CH2
``` monomer n=1 64.8% by weight;
dimer n=2 6.8% by weight.

Tris(hydroxyethyl)isocyanurate tris(allyl-carbonate):
monomer 19.2% by weight;

[Structure: tris(hydroxyethyl)isocyanurate tris(allyl-carbonate) monomer]

dimer 0.8% by weight.

[Structure: tris(hydroxyethyl)isocyanurate tris(allyl-carbonate) dimer]

Mixed allyl-carbonate: 5.1% by weight

[Structure: mixed allyl-carbonate]

with the residual percentage being essentially constituted by the higher oligomers of the above species.

Example 3

To the same equipment as disclosed in Example 1, there are charged:
Pentaerythritol: 45.4 g (0.33 mol);
Diethylene glycol: 106.1 g (1.00 mol);
Diallyl-carbonate: 947 g (6.66 mol);
Solution at 30% by weight of sodium methoxide in methanol: 0.40 ml.

The reaction is carried out for 45 minutes at a temperature of 109°–118° C., and under a pressure of 150 torr, with allyl alcohol being distilled off as it forms (total 218 g; purity of 90%).

After cooling, the reaction mixture is washed with two portions of 500 ml each, of distilled water.

The excess of diallyl-carbonate is then distilled under 1 torr, with increasing temperature up to 120° C.

The so obtained product is decolorized with 2% by weight of activated charcoal for 4 hours at 80° C. and is then filtered.

In this way, 380 g is obtained of a liquid product having the following characteristics:
Viscosity (25° C.): 87.7 cst
Density (20° C.): 1 1939 g/ml
Refractive index ($n_D^{20}$): 1.4616
Colour (APHA): 5

This product is a mixture of both monomer and oligomer diethylene glycol bis(allyl-carbonate), pentaerythritol tetrakis(allyl-carbonate), and of mixed allyl-carbonates, having the following presumed composition:

Diethylene glycol bis(allyl-carbonate):

```
  O—CH2—CH=CH2
  |
  C=O                              O
  |                                ‖
  O(CH2—CH2—O—CH2—CH2—O—C—O)n—CH2—CH=CH2
``` monomer n=1 53.9% by weight;
dimer n=2 9.0% by weight.

Pentaerythritol tetrakis(allyl-carbonate): monomer 13.0% by weight;

$$C(CH_2-O-\underset{\underset{O}{\|}}{C}-O-CH_2-CH=CH_2)_4$$

dimer 2.5% by weight.

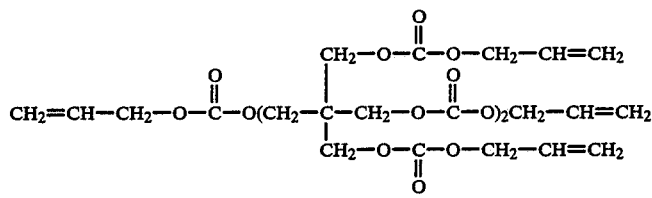

Mixed allyl-carbonate: 10% by weight

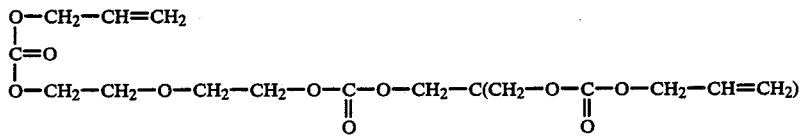

with the residual percentage being essentially constituted by the higher oligomers of the above species.

Example 4

By operating according to as disclosed in Examples 1–3 the polymerizable compositions Nos. 1, 2, 3 and 4 are prepared by reacting diallyl-carbonate (DAC) with mixtures of pentaerythritol (PE) and diethylene glycol (DEG), at various molar ratios (R) of DAC to the sum of (PE+DEG), as shown in following Table 1. In said table, also the characteristics of viscosity (cst at 25° C.); density (g/ml at 20° C.) and refractive index ($n_D^{20}$) in the obtained polymerizable liquid compositions are reported.

TABLE 1

| Composition No. | | 1 | 2 | 3 | 4 |
|---|---|---|---|---|---|
| Mixture | PE (% by weight) | 25 | 25 | 30 | 30 |
| | DEG (% by weight) | 75 | 75 | 70 | 70 |
| Ratio of DAC/(PE + DEG) | | 4/1 | 5/1 | 5/1 | 4/1 |
| Viscosity (cst; 25° C.) | | 73.6 | 53.5 | 87.7 | 110 |
| Density (g/ml; 20° C.) | | 1.190 | 1.183 | 1.194 | 1.202 |
| $n_D^{20}$ | | 1.4609 | 1.4598 | 1.4616 | 1.4624 |

The compositions, after the addition of di-cyclohexyl-peroxy-dicarbonate (DCPD); 5% by weight in the composition) are submitted to polymerization in the same way as previously set forth and on the hardened compositions, the characteristics reported in Table 2 are determined.

Example 5

For comparative purposes, the polymerizable liquid compositions Nos. 5, 6 and 7 according to the prior art are prepared, by mixing triallyl-cyanurate (TAC) and diethylene glycol bis(allyl-carbonate) (BACGD), this latter being the product resulting from the transesterification between diallyl-carbonate and diethylene glycol in the mutual molar ratio of 12/1. The characteristics of these liquid compositions are reported in following Table 3.

TABLE 3

| Composition No. | 5 | 6 | 7 |
|---|---|---|---|
| TAC | — | 5.5 | 10.5 |
| BACGD | 100 | 94.5 | 89.5 |
| Viscosity (cst; 25° C.) | 14 | 14.1 | 14.2 |
| Density (g/ml; 20° C.) | 1.151 | 1.150 | 1.148 |
| $n_D^{20}$ | 1.4520 | 1.4549 | 1.4576 |

After the addition of di-cyclohexyl-peroxydicarbonate (DCPD) in an amount of 5% of the weight of the same compositions, said compositions are submitted to polymerization under such conditions as stated in the text, and on the hardened compositions the characteristics as reported in Table 2 are determined.

TABLE 2

| COMPOSITION No. | | 1 | 2 | 3 | 4 | 5 | 6 | 7 |
|---|---|---|---|---|---|---|---|---|
| Density, | (g/cm³) | 1.3290 | 1.3274 | 1.3317 | 1.3316 | 1.3111 | 1.3112 | 1.3111 |
| Shrinkage, | % | 10.4 | 10.8 | 10.3 | 9.7 | 12.2 | 12.3 | 12.45 |
| $n_D^{20}$ | | 1.5016 | 1.5014 | 1.5016 | 1.5015 | 1.5010 | 1.5041 | 1.5070 |
| Haze, | % | 0.27 | 0.26 | 0.36 | 0.40 | 0.16 | 0.19 | 0.15 |
| Transmittance at visible wave lengths, | % | 92.1 | 91.8 | 91.7 | 91.7 | 93.3 | 92.5 | 92.0 |
| Yellow index | | 2.90 | 3.20 | 3.50 | 3.89 | 1.20 | 1.59 | 2.88 |
| Elastic modulus at bending | (MPa) | 2900 | 2900 | 3050 | 3070 | 2400 | 2500 | 2680 |
| Rockwell hardness | (M) | 111 | 112 | 109 | 112 | 97 | 104 | 108 |
| Izod impact strength, without notch | (Kj/m²) | 6.0 | 5.2 | 4.2 | 4.9 | 7.9 | 7.0 | 4.0 |
| Taber abrasion resistance | (XPMMA) | — | — | — | — | 18 | 20 | 25 |
| Sutherland abrasion resistance | | 8/9 | 8/9 | 9/10 | 9 | 0 | 5/6 | 6 |
| HDT, | °C. | 108.2 | 110.8 | 142.9 | 121.3 | 66 | 73 | 89.6 |

Example 6

The polymerizable liquid compositions Nos. 8, 9, and 10 are prepared by starting from diallyl-carbonate (DAC), tris(hydroxyethyl)isocyanurate (THEIC) and diethylene glycol (DEG), as shown in following Table 4.

TABLE 4

| Composition No. | | 8 | 9 | 10 |
|---|---|---|---|---|
| Mixture | THEIC (% by weight) | 40 | 50 | 30 |
| | DEG (% by weight) | 60 | 50 | 70 |
| Ratio of DAC/(THEIC + DEG) | | 5/1 | 6/1 | 12/1 |
| Viscosity (cst; 25° C.) | | 95.7 | 187 | 48.5 |
| Density (g/ml; 20° C.) | | 1.220 | 1.2308 | 1.1907 |
| $n_D^{20}$ | | ND* | ND* | 1.4640 |

ND = Not Determined

After the addition of di-cyclohexyl-peroxydicarbonate (DCPD) in an amount of 5% of the weight of the same compositions, said compositions are submitted to polymerization under such conditions as stated in the text, and on the hardened compositions the characteristics as reported in Table 5 are determined.

Example 7

The polymerizable compositions Nos. 11 and 12 are prepared by starting from diallyl-carbonate (DAC), trimethylol-propane (TMP) and diethylene glycol (DEG), as shown in following Table 6.

TABLE 6

| Composition No. | | 11 | 12 |
|---|---|---|---|
| Mixture | TMP (% by weight) | 50 | 30 |
| | DEG (% by weight) | 50 | 70 |
| Ratio of DAC/TMP+DEG | | 4/1 | 5/1 |
| Viscosity (cst; 25° C.) | | 96.1 | 34.5 |
| Density (g/ml; 20° C.) | | 1.1716 | 1.164 |
| $n_D^{20}$ | | 1.4635 | 1.4585 |

After the addition of di-cyclohexyl-peroxydicarbonate (DCPD) in an amount of 5% of the weight of the same compositions, said compositions are submitted to polymerization under such conditions as stated in the text, and on the hardened compositions the characteristics as reported in Table 5 are determined.

TABLE 5

| COMPOSITION No. | 8 | 9 | 10 | 11 | 12 |
|---|---|---|---|---|---|
| Density, (g/cm³) | 1.3473 | 1.3516 | 1.3288 | 1.3031 | 1.3077 |
| Shrinkage, % | 9.4 | 8.9 | 10.4 | 10.1 | 11.0 |
| $n_D^{20}$ | 1.5080 | 1.5082 | 1.5052 | 1.5010 | 1.5004 |
| Haze, % | 0.08 | 0.10 | 0.10 | 0.19 | 0.14 |
| Transmittance at visible wave lengths, % | 92.4 | 92.0 | 92.7 | 92.5 | 93.0 |
| Yellow index | 3.5 | 4.0 | 2.4 | 3.2 | 1.48 |
| Elastic modulus at bending (MPa) | 3380 | 3300 | 3160 | 2950 | 2510 |
| Rockwell hardness (M) | 104 | 110 | 107 | 109 | 100 |
| Izod impact strength, without notch (KJ/m²) | 10 | 9.6 | 7.8 | 4.5 | 8.6 |
| Taber abrasion resistance (XPMMA) | 16 | 18 | 24 | 27 | 18 |
| Sutherland abrasion resistance | — | — | — | 6 | 5 |
| HDT, °C. | 91 | 98.3 | 93.4 | 131.8 | 90.0 |

Example 8

A liquid and polymerizable composition is prepared by starting from:

1,4-Cyclohexane-dimethanol 138.7 g (0.96 mol)
Diethylene glycol 46.2 g (0.44 mol)
Diallyl-carbonate 795 g (5.6 mol)
Sodium methoxide, as a solution at 30% by weight of sodium methoxide in methanol 0.30 ml The reaction is carried out for 1 hour at a temperature of 114°–121° C., and under a pressure of 150 torr, with allyl alcohol being distilled off as it forms (total 167 g; purity of 97%).

After cooling, the reaction mixture is washed with two portions, of 500 ml each, of distilled water.

The excess of diallyl-carbonate is then distilled off by operating under a pressure of 1 torr, with increasing temperature up to 120° C.

The obtained product is decolorized with 2% by weight of activated charcoal, for 4 hours at 80° C., and is then filtered.

In this way, 360 g is obtained of a liquid product having the following characteristics:

Viscosity (25° C.): 62.1 cst
Density (20° C.): 1.124 g/ml
Refractive index ($n_D^{20}$): 1 468
Colour (APHA): 5

This product is formed by both monomer and oligomer bis(allyl-carbonates) of cyclohexane-dimethanol, diethylene glycol or mixed allyl-carbonates, having the following presumed distribution:

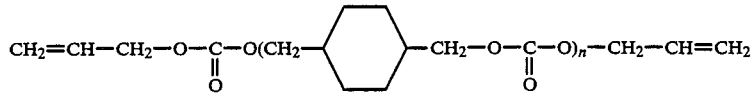

monomer n=1 45.9% by weight;

dimer n=2 12.2% by weight;
trimer n=3 2.8% by weight.

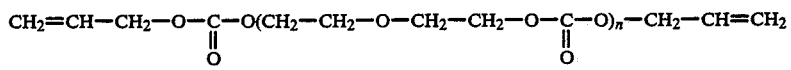

monomer n=1 18.5% by weight;
dimer n=2 2.2% by weight;
trimer n=3 0.2% by weight.

The mixed cyclohexane-dimethanol and diethylene glycol bis(allyl-carbonate) dimer:

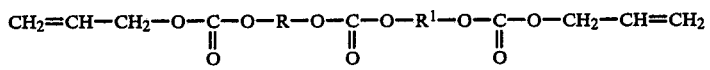

wherein

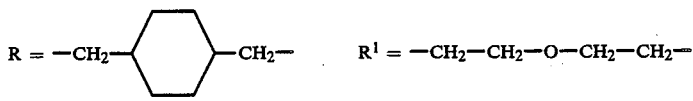

is present in an amount of 10.3% by weight, and the relevant trimer is present in an amount of 5.2% by weight.

The mixture contains furthermore an overall amount of 2.7% by weight of higher oligomers than the trimer.

After the addition of di-cyclohexyl-peroxydicarbonate (DCPD) in an amount of 5% of its weight, said composition is submitted to polymerization under such conditions as stated in the text, and on the hardened compositions the characteristics as reported in Table 6 are determined.

TABLE 6

| | |
|---|---|
| Density, (g/cm³) | 1.2366 |
| Shrinkage, % | 9.1 |
| $n_D^{20}$ | 1.5040 |
| Haze, % | 0.23 |
| Transmittance at visible wave lengths, % | 92.7 |
| Yellow index | 1.10 |
| Elastic modulus at bending (MPa) | 2,320 |
| Rockwell hardness (M) | 108 |
| Izod impact strength, without notch (KJ/m²) | 5.0 |
| Taber abrasion resistance (XPMMA) | 18 |
| HDT, °C. | 93.0 |

Example 9

To a three-neck flask with jacket, fitted with a thermometer, a magnetic stirrer and an overhead distillation column with 20 perforated trays, there are charged:
1,4-Cyclohexane-dimethanol 288.4 g ( 2.00 mol)
Neopentyl glycol 123.6 g ( 1.19 mol)
Diallyl carbonate 1,810 g (12.75 mol)
Solution at 30% by weight of sodium methoxide in methanol 1.60 ml The reaction is carried out for 45 minutes at a temperature of 107°-116° C., and under a pressure of 150 Torr, with allyl alcohol being distilled off as it forms (total 370 g).

After cooling, the reaction mixture is washed with two portions of 1,000 ml each, of distilled water.

The excess of diallyl-carbonate is distilled under 1 torr, with increasing temperature up to 120° C.

The obtained product is decolorized by contact with 2% by weight of activated charcoal, for 4 hours at 80° C., and is then filtered.

In this way, 840 g is obtained of a liquid product having the following characteristics:
Viscosity (cst; 25° C.) 73
Density (g/ml; 20° C.) 1.099
Colour (APHA) 5

This product is a mixture of both monomer and oligomer cyclohexane-dimethanol bis(allyl-carbonate), neopentyl glycol bis(allyl-carbonate), and of mixed allyl-carbonates, having the following approximate composition:

Cyclohexane-dimethanol bis(allyl-carbonate):
monomer 42% by weight;
dimer 10% by weight;
Neopentyl glycol bis(allyl-carbonate):
monomer 19% by weight;
dimer 3% by weight;
Mixed bis(allyl-carbonate)

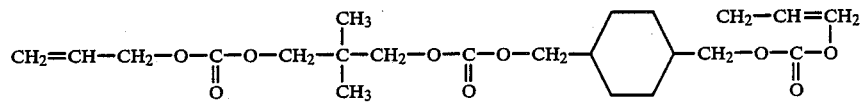

10% by weight;
with the residual percentage being essentially constituted by the higher oligomers of the above species.

After the addition of di-cyclohexyl-peroxydicarbonate (DCPD) in an amount of 5% of weight of the same composition, the reaction product is submitted to polymerization under such conditions as stated in the text, and on the hardened compositions the characteristics as reported in Table 7 are determined.

TABLE 7

| | |
|---|---|
| Density, (g/cm³) | 1.2104 |
| Shrinkage, % | 9.3 |
| $n_D^{20}$ | 1.500 |
| Haze, % | 0.22 |
| Transmittance at visible wave lengths, % | 92.7 |
| Yellow index | 1.2 |
| Elastic modulus at bending (MPa) | 2,400 |
| Rockwell hardness (M) | 112 |
| Izod impact strength, | 4.6 |

TABLE 7-continued

| | |
|---|---|
| without notch (KJ/m$^2$) | |
| Taber abrasion resistance (xPMMA) | 14 |
| HDT, °C. | 86.2 |

In Table 8, the results are reported of the tests of water absorption for long soaking times, as compared to the values measured on the polymer of diethylene glycol bis(allyl-carbonate) (BACGD), taken as the reference standard.

TABLE 8

| Soaking Time | Weight Change %, Composition of Example 7 | BACGD |
|---|---|---|
| 1 day | 0.12 | 0.27 |
| 7 days | 0.32 | 0.65 |
| 15 days | 0.43 | 0.96 |

We claim:

1. Liquid composition polymerizable with little shrinkage to produce organic glasses having high thermal stability, comprising a complex mixture reaction product obtained by a process comprising reacting under transesterification conditions diallylcarbonate (A) with either a first mixture or second mixture:
   (i) the first mixture comprising a linear or branched aliphatic diol containing from 3 to 10 carbon atoms (B), and a linear or branched aliphatic, cycloaliphatic or heterocyclic polyol containing from 4 to 20 carbon atoms and from 3 to 6 hydroxy atoms (C),
   (ii) the second mixture comprising the (B) diol with a cycloaliphatic diol (C'), with a molar ratio A/(B+C) or A/(B+C') equal to, or higher than 3/1, and with an amount of (C) in the (B+C) mixture equal to, or lower than, 70% by weight, or with an amount of (C') in the (B+C') mixture equal to, or lower than, 90% by weight.

2. The composition according to claim 1, wherein the complex mixture reaction product is obtained by reacting the diallylcarbonate (A) with the first mixture.

3. The composition according to claim 1, wherein the complex mixture reaction product is obtained by reacting the diallylcarbonate (A) with the second mixture.

4. The composition according to claim 1, with a molar ratio of (A)/(B+C) or of (A)/(B+C') of from 3/1 to 12/1, and with the amount of the (C) component in the (B+C) mixture of from 20 to 60% by weight and of the (C') component in the (B+C') mixture of from 20 to 80% by weight.

5. The composition according to claim 1, wherein the (B) diol is selected from the group consisting of diethylene glycol, triethylene glycol, tetraethylene glycol, dipropylene glycol, 1,4-butane-diol, 1,6-hexane-diol, 1,3-propane-diol, neopentyl glycol and 2,2,4-trimethyl-1,3-pentane-diol.

6. The composition according to claim 5, wherein the (B) diol is diethylene glycol.

7. The composition according to claim 1, wherein the (C) polyol is selected from the group consisting of pentaerythritol, trimethylol-propane, di-pentaerythritol, di-trimethylol-propane and tris(hydroxyethyl)isocyanurate.

8. The composition according to claim 7, wherein the (C) polyol is pentaerythritol, trimethylol-propane or tris(hydroxyethyl)isocyanurate.

9. The composition according to claim 1, wherein the (C') component is selected from 1,4-cyclohexane-dimethanol or 4,8-bis(hydroxy-methyl)tricyclo-[5.2.1.0$^{2,6}$]decane.

10. The composition according to claim 1, wherein the reaction is carried out at a temperature from 80° to 160° C. in the presence of an alkaline catalyst, with continuous removal from the reaction of allyl alcohol, which is formed as the reaction byproduct.

11. The composition according to claim 10, wherein the reaction is carried out at a temperature from 90° to 130° C.

12. The composition according to claim 10, wherein the alkaline catalyst is selected from the group consisting of: hydroxides, carbonates and alkoxides of alkali metal, organic bases and basic ion-exchange resins.

13. The composition according to any of the preceding claims, further comprising a polymerization initiator, of from 1 to 6 parts by weight, per each 100 parts by weight of the composition.

14. The composition according to claim 13, wherein the initiator is selected from di-cyclo-hexylperoxy-dicarbonate, di-benzoyl-peroxide, di-sec.-butylperoxy-dicarbonate or sec.-butyl-cyclohexyl-peroxy-dicarbonate.

15. A method of preparing organic glasses having high thermal stability comprising:
   (a) reacting under transesterification conditions diallylcarbonate (A) with either a first mixture of second mixture to produce a liquid composition:
      (i) the first mixture comprising a linear or branched aliphatic diol containing from 3 to 10 carbon atoms (B), and a linear or branched aliphatic, cycloaliphatic or heterocyclic polyol containing from 4 to 20 carbon atoms and from 3 to 6 hydroxy atoms (C),
      (ii) the second mixture comprising the (B) diol with a cycloaliphatic diol (C'), with a molar ration A/(B+C) or A/(B+C') equal to, or higher than 3/1, and with an amount of (C) in the (B+C) mixture equal to, or lower than, 70% by weight, or with an amount of (C') in the (B+C') mixture equal to, or lower than, 90% by weight, and
   (b) polymerizing the liquid composition to form the organic glasses.

16. The method of preparing organic glasses according to claim 15, wherein (b) includes a polymerization initiator.

17. The method of preparing organic glasses according to claim 15, including a casting technique to form sheets or lenses of the organic glasses.

18. Organic glass prepared according to claim 17.

* * * * *